(12) United States Patent
Sakai

(10) Patent No.: US 9,263,925 B2
(45) Date of Patent: Feb. 16, 2016

(54) BLOWER

(71) Applicant: Shinano Kenshi Kabushiki Kaisha, Ueda-shi, Nagano (JP)

(72) Inventor: Takeki Sakai, Ueda (JP)

(73) Assignee: SHINANO KENSHI KABUSHIKI KAISHA, Nagano (JP)

( * ) Notice: Subject to any disclaimer, the term of this patent is extended or adjusted under 35 U.S.C. 154(b) by 0 days.

(21) Appl. No.: 14/468,779

(22) Filed: Aug. 26, 2014

(65) Prior Publication Data

US 2015/0061429 A1 Mar. 5, 2015

(30) Foreign Application Priority Data

Aug. 30, 2013 (JP) ................................. 2013-180103

(51) Int. Cl.
*H02K 9/06* (2006.01)
*H02K 7/14* (2006.01)

(52) U.S. Cl.
CPC ...... *H02K 9/06* (2013.01); *H02K 7/14* (2013.01)

(58) Field of Classification Search
CPC ...................................................... H02K 9/06
USPC ......................................... 310/89, 52, 56–64
See application file for complete search history.

(56) References Cited

U.S. PATENT DOCUMENTS

| 3,610,975 | A | * | 10/1971 | Onjanow | 310/57 |
| 4,120,616 | A | * | 10/1978 | Dwyer et al. | 417/373 |
| 5,925,960 | A | * | 7/1999 | Hayes | 310/211 |
| 2011/0175468 | A1 | * | 7/2011 | Dutau | 310/58 |

FOREIGN PATENT DOCUMENTS

| JP | 5-56603 | 3/1993 |
| JP | 8-275457 | 10/1996 |

* cited by examiner

*Primary Examiner* — Naishadh Desai
(74) *Attorney, Agent, or Firm* — Stephen J. Weyer, Esq.; Stites & Harbison, PLLC.

(57) ABSTRACT

The blower comprises: a blower case; a motor case; and a shaft pierced through the both cases. A first communication hole, which is formed in one of axial end faces of the motor case, introduces a part of compressed air into the motor case. A second communication hole, which is formed in the other axial end face of the motor case, discharges the compressed air to outside of the motor case. An external guidance path introduces the discharged air toward an outside face of the motor case. By actuating a motor, the compressed air, which has been introduced from the blower case into the motor case via the first communication hole, is discharged from the second communication hole, and the discharged air is introduced by the external guidance path and blown out toward the outside face of the motor case.

4 Claims, 3 Drawing Sheets

BLOWER

CROSS-REFERENCE TO RELATED APPLICATION

This application is based upon and claims the benefit of priority of the prior Japanese Patent Application No. P2013-180103, filed on Aug. 30, 2013, and the entire contents of which are incorporated herein by reference.

FIELD

The present invention relates to a blower having a cooling mechanism for air-cooling a motor.

BACKGROUND

Various types of spindle units, which cool motors for rotating rotors, have been developed. For example, in a digital copier, laser beam printer, etc., a polygon mirror is rotated, by a motor, at a high rotational speed, so a wire diameter of motor coils must be increased so as to pass high electric current. However, an amount of heat generation of the motor is increased by increasing an amount of the electric current passing through the motor coils. So, a temperature of the motor increases significantly. Further, heat is generated in a bearing section, which rotatably holds a rotor of the motor.

To solve the above described problem, a modified spindle unit is disclosed in, for example, Japanese Laid-open Patent Publication No. 8-275457. In the spindle unit, an air suction hole is formed in a mirror case which accommodates a polygon mirror, an air discharging hole is formed in a motor case which accommodates a motor, a communication hole is formed in a separator which separates the mirror case from the motor case, and communication holes are formed in a motor core and located on an outer side of a slot. By applying electric current to motor coils, the polygon mirror is rotated by rotation of a rotor, air which has been sucked through the air suction hole by negative pressure produced around the polygon mirror flows from a rotational center of the polygon mirror to an outer circumferential part thereof, and the air flows into the motor case through the communication hole of the separator. Since the cool air flows into the motor case, hot air in the motor case is discharged to outside of the motor case through the communication holes of the motor core, so that a stator can be cooled.

In case of using a high-current motor, a motor case having high heat capacity must be cooled. The motor case cannot be sufficiently cooled by sucking air thereinto. To sufficiently cool the motor case, a modified cooling mechanism is disclosed in Japanese Laid-open Patent Publication No. 5-56603. In the cooling mechanism, a cooling fan is provided to a rotary shaft which is outwardly extended from the motor case, and a fan cover is provided to cover the cooling fan. With this structure, the motor case can be cooled.

SUMMARY

In case of using the high-current motor, the motor case cannot be sufficiently cooled by cooling inside of the motor case only, so the motor case having high heat capacity must be directly cooled. An object of the spindle unit disclosed in Japanese Laid-open Patent Publication No. 8-275457 is to cool the stator in the motor case, so the spindle unit cannot sufficiently cool the motor case having high heat capacity. And, the communication holes are formed in the motor core to cool the stator, so number of production processes of the spindle unit must be increased, and a production cost must be increased. Further, number of magnetic paths must be reduced, so performance of the motor must be lowered.

In the cooling mechanism disclosed in Japanese Laid-open Patent Publication No. 5-56603, the cooling fan is provided to the rotary shaft outwardly extended from the motor case, so the cooling mechanism must be large, and number of parts is increased. Further, a motor core, etc. generate heat, so the entire motor cannot be cooled efficiently.

Accordingly, it is an object to provide a blower capable of solving the above described problems of the conventional technologies. In the blower of the present invention, an inside and an outside of a motor case can be efficiently cooled by using compressed air from a blower case.

To achieve the object, the present invention has following structures.

Namely, the blower of the present invention comprises:
a blower case accommodating an impeller;
a motor case accommodating a stator and a rotor, the motor case being integrated with the blower case; and
a shaft, to which the impeller and the rotor are attached, being pierced through the blower case and the motor case,
an air is sucked into the blower case, by rotation of the impeller, from an axial direction and blown out in a circumferential direction,
a first communication hole, which is formed in one of axial end faces of the motor case, introduces a part of compressed air from the blower case into the motor case,
a second communication hole, which is formed in the other axial end face of the motor case, discharges the compressed air, which has passed through the motor case, to outside of the motor case,
an external guidance path is formed over the other axial end face of the motor case and introduces the discharged air, which has discharged from the second communication hole, toward an outside face of the motor case, and
by actuating a motor, the compressed air, which has been introduced from the blower case into the motor case via the first communication hole, is discharged from the second communication hole, and the discharged air, which has been discharged from the second communication hole, is introduced by the external guidance path and blown out toward the outside face of the motor case.

With the above described structure, by actuating the motor to rotate the impeller, a part of the compressed air is introduced from the blower case into the motor case via the first communication hole formed in the one axial end face of the motor case, and the compressed air passed through the motor case is discharged to the outside of the motor case via the second communication hole formed in the other axial end face, so that the inside of the motor case can be cooled by a part of the compressed air to be blown out.

Further, the discharged air discharged from the second communication hole is blown out toward the outside face of the motor case via the external guidance path, so that the motor case having high heat capacity can be sufficiently cooled from the outside, too.

Therefore, the inside and outside of the motor case can be efficiently cooled by using the compressed air introduced from the blower case.

Preferably, a guide member, which constitutes the external guidance path, covers the other axial end face of the motor case, and
a heat radiation fins are provided to the outside face of the motor case.

With this structure, the motor case can be further efficiently cooled by the discharged air, which is introduced toward the outside face of the motor case by the guide member, and heat radiation performed by the heat radiation fins.

Preferably, a plurality of the first communication holes are formed a plurality of the first communication holes are formed according to a position of a motor core, and
   a plurality of the second communication holes are formed around the shaft, and
   each of the second communication holes is circumferentially shifted a prescribed angle with respect to each of the first communication holes.

With this structure, the compressed air, which is introduced into the motor case via the first communication holes, firstly cools the motor core which easily generates heat, and the air flow is disturbed in the motor case, then the air is discharged from the second communication holes. Therefore, the inside of the motor case can be further efficiently cooled.

In the blower of the present invention, the inside and outside of the motor case can be efficiently cooled by the compressed air introduced from the blower case.

BRIEF DESCRIPTION OF THE DRAWINGS

Embodiments of the present invention will now be described by way of examples and with reference to the accompanying drawings.

DESCRIPTION OF THE EMBODIMENTS

Preferred embodiments of the present invention will now be described in detail with reference to the accompanying drawings.

Firstly, a schematic structure of a blower of the present embodiment will be explained with reference to FIGS. 1-3.

Figure 3:
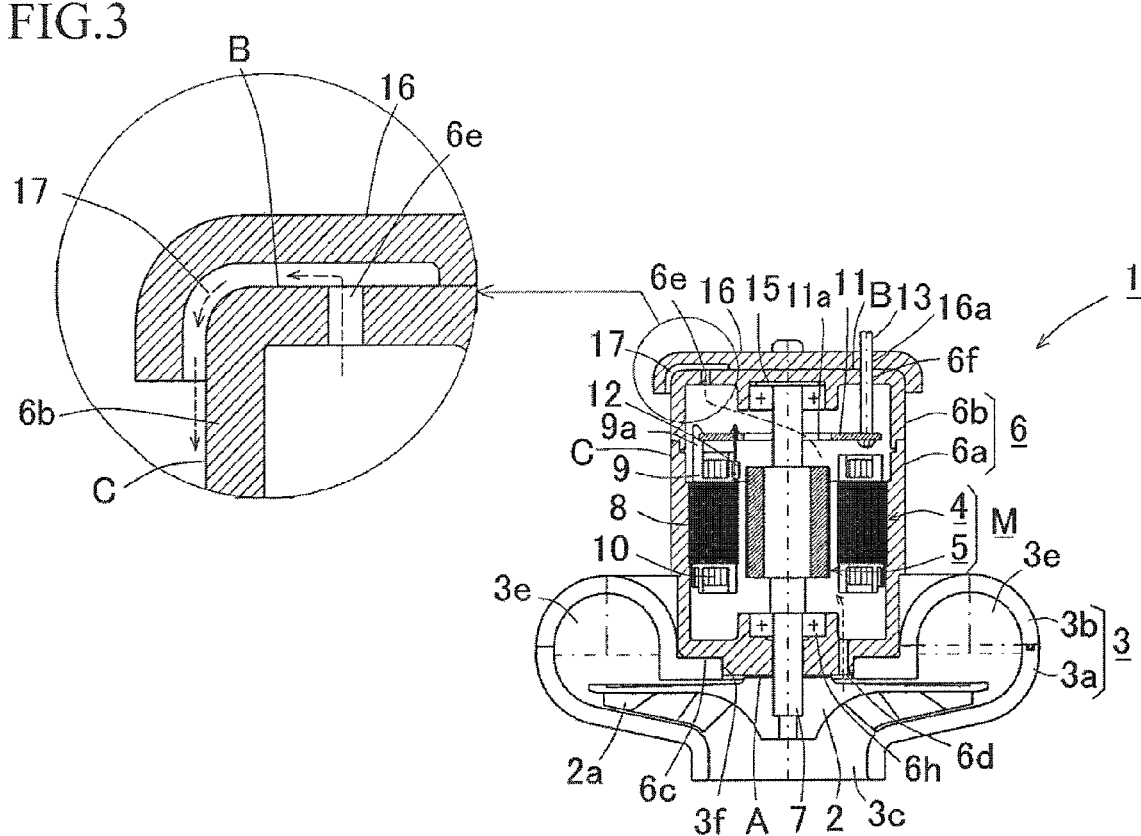
FIG. 3 includes a sectional view of the blower taken along a line X-X shown in FIG. 1 and an enlarged sectional view of a second communication hole.

As shown in FIG. 3, the blower 1 comprises: a blower case 3 in which an impeller 2 is accommodated; and a motor case 6 in which a stator 4 and a rotor 5 of a motor M are accommodated. The blower case 3 and the motor case 6 are integrated as one body. A shaft 7 is pierced through the blower case 3 and the motor case 6. The impeller 2, which is accommodated in the blower case 3, and the rotor 5, which is accommodated in the motor case 6, are attached to the shaft 7. By actuating the motor M, the impeller 2 is rotated, so that air is sucked into the blower case 3, from an axial direction, and compressed, then the compressed air is sent in a circumferential direction.

As shown in FIG. 3, the blower case 3 is constituted by a first blower case constituting member 3a and a second blower case constituting member 3b. An air inlet 3c is formed in a center part of the first blower case constituting member 3a. Recessed grooves are respectively formed in radially outer parts of the first and second blower case constituting members 3a and 3b. The recessed grooves are disposed to face each other, so that a compression chamber (flow path) 3e is formed in the blower case 3. An air outlet 3d is extended, in a tangential direction, from an outside face of the blower case 3 (see FIG. 2). One end part of the shaft 7 is inserted in the blower case 3, and the impeller 2 is integrally attached to the shaft 7. The impeller 2 is attached to the one end of the shaft 7 by, for example, molding, adhesive, press fit, etc. Blades 2a of the impeller 2 are radially formed.

Figure 2:
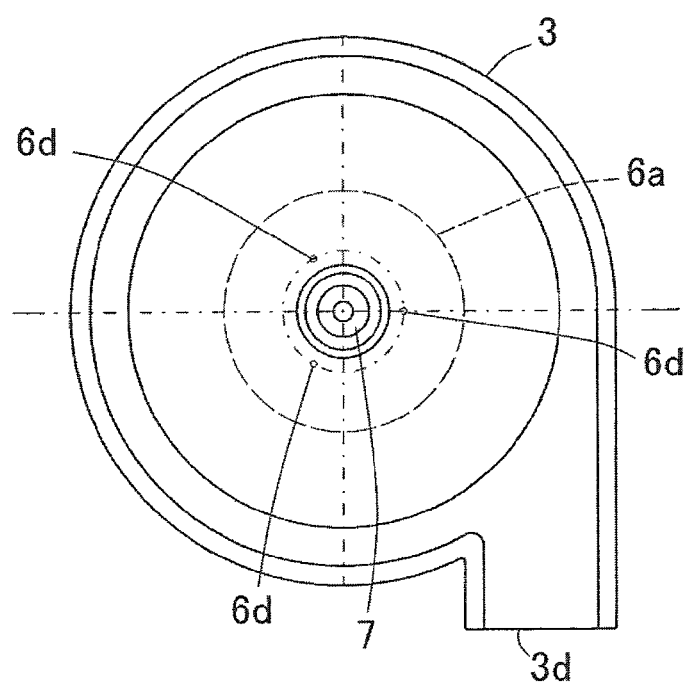
FIG. 2 is a plan view of the blower seen from a blower case side, in which an impeller is unshown.

In FIG. 2, the motor case 6 is integrally attached to the second blower case constituting member 3b. Namely, the motor case 6 is attached to the opposite side of the air inlet 3c, which is enclosed by the compression chamber 3e. As shown in FIG. 3, the motor case 6 is constituted by a first motor case constituting member 6a and a second motor case constituting member 6b. The motor case 6 is composed of a material having relatively high heat capacity, e.g., aluminum, aluminum alloy. A step-shaped part 6c is formed in an end face A of the first motor case constituting member 6a, which is used as an attaching face, and fitted in a center hole 3f of the second blower case constituting member 3b, so that the both members 3a and 6a are integrated as one body. A plurality of first communication holes (e.g., three first communication holes) 6d, which introduce a part of the compressed air from the blower case 3 into the motor case 6, are formed in the end face A of the first motor case constituting member 6a, which is fitted in the blower case 3, and disposed around the shaft 7 at equal angular intervals, e.g., 120°. The first communication holes 6d are located on the opposite side of the blades 2a with respect to the impeller 2.

Next, an inner structure accommodated in the motor case 6 will be explained. In FIG. 3, the shaft 7 is rotatably held by bearing sections 6h, which are respectively provided to the first and second motor case constituting members 6a and 6b. Various types of bearings, e.g., roll bearing, slide bearing, oil impregnated metal bearing, fluid dynamic bearing, may be used as the bearing sections 6h. The rotor (rotor magnet) 5 is concentrically attached to the shaft 7. A motor core 8 of the stator 4 is fixed on an inner wall face of the first motor case constituting member 6a. Motor coils 10 are wound on tooth sections, which face the rotor 5 and which are inwardly extended from the motor core 8, with an insulator 9.

In the second motor case constituting member 6b, a motor circuit board 11 is held by a board holder 9a, which is extended from the insulator 9. Electronic parts, e.g., hall element, are mounted on the motor circuit board 11. A clearance hole 11a, through which the shaft 7 passes, is formed in a center part of the motor circuit board 11. The other end of the shaft 7, which is the opposite end to the one end where the impeller 2 is attached, is held by a thrust holder 15, which is provided to the second motor case constituting member 6b. The other end of the shaft 7 is rounded. The shaft 7 is rotatably held by the thrust holder 15. The thrust holder 15 is composed of a resin material having an excellent sliding property to the shaft 7, e.g., polyether ether ketone (PEEK).

Figure 1:
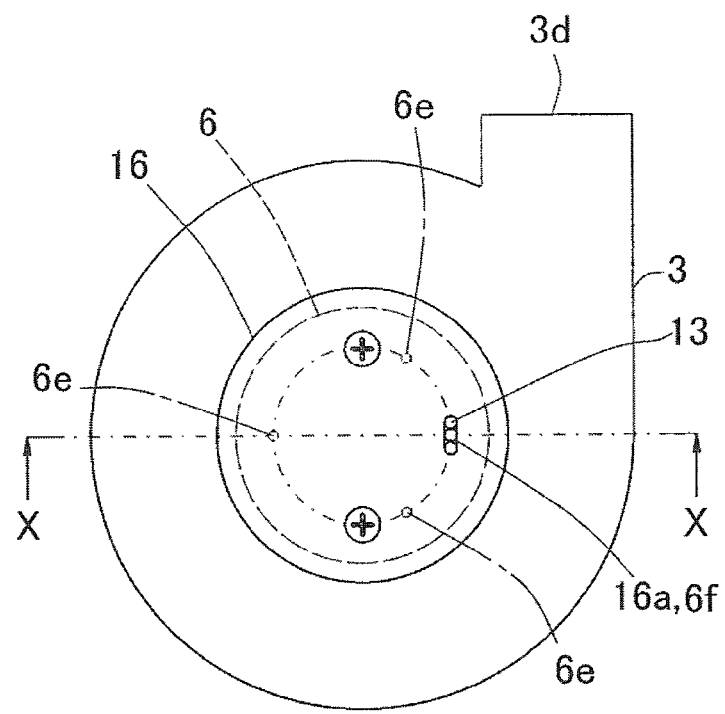
FIG. 1 is a plan view of a blower of an embodiment seen from a motor case side.

In FIG. 1, a plurality of second communication holes (e.g., three second communication holes) 6e, which introduce the compressed passed through the motor case 6 to outside thereof, are formed in an end face B of the second motor case constituting member 6b, which is located on the axial opposite side of the attaching face A of the first motor case constituting member 6a, and disposed around the shaft 7 at equal angular intervals, e.g., 120°. Note that, the positions of the second communication holes 6e need not be formed in the axial end face B of the second motor case constituting member 6b. For example, the second communication holes 6e may be formed in an outside face of the second motor case constituting member 6b near the end face B.

Further, a lead hole 6f, from which lead wires 13 for supplying electricity to the motor coils 10 are extended outward, is formed in the end face B of the second motor case constituting member 6b.

As shown in FIG. 3, a guide member 16 covers the other axial end face of the motor case 6, i.e., the end face B of the second motor case constituting member 6b. The guide member 16 is fixed by screws. The guide member 16 is curved along a surface of the end part of the second motor case constituting member 6b, so that an external guidance path 17 is formed from the end face B of the second motor case constituting member 6b to the outside face C thereof. As shown in the enlarged view of FIG. 3, the discharged air which has been discharged from the second communication holes 6e is introduced, by the guide member 16 whose inner diameter is greater than an outer diameter of the second motor case constituting member 6b, via the external guidance path 17 and blown out from the end face B side of the motor case 6 toward the outside face C thereof. Note that, a lead hole 16a, which is communicated to the lead hole 6f of the second motor case constituting member 6b and from which the lead wires 13 for supplying electricity to the motor coils 10 are extended outward, is formed in the guide member 16, too. The guide member 16 may be further extended along the outside face C of the second motor case constituting member 6b.

The first communication holes 6d (see FIG. 2) and the second communication holes 6e (see FIG. 1) may be axially coincided with each other. Preferably, each of the second communication holes 6e disposed around the shaft 7 is circumferentially shifted a prescribed angle (e.g., 60°) with respect to each of the first communication holes 6d (see FIGS. 1 and 2). With this structure, a part of the compressed air, which is introduced into the motor case 6 via the first communication holes 6d of the one axial end face of the motor case 6, firstly cools the motor core 8, which easily generates heat, and the air flow is disturbed in the motor case 6 as indicated by dashed line arrows shown in FIG. 3, then the air is discharged to the outside from the second communication holes 6e. Therefore, the inside of the motor case 6 can be efficiently cooled.

By actuating the motor M and rotating the impeller 2, a part of the compressed air is introduced from the blower case 3 into the motor case 6 via the first communication holes 6d formed in the one axial end face of the motor case 6, and the compressed air passed through the motor case 6 is discharged to the outside of the motor case from the second communication holes 6e formed in the other axial end face. Therefore, the inside of the motor case 6 can be cooled by using a part of the compressed air for air blowing.

Since the discharged air which has been discharged from the second communication holes 6e is blown out, from the external guidance path 17, toward the outside face C of the motor case 6, the motor case 6 having high heat capacity can be efficiently cooled from the outside.

Therefore, the inside and outside of the motor case 6 can be efficiently cooled by the compressed air compressed in the blower case 3.

Figure 4:
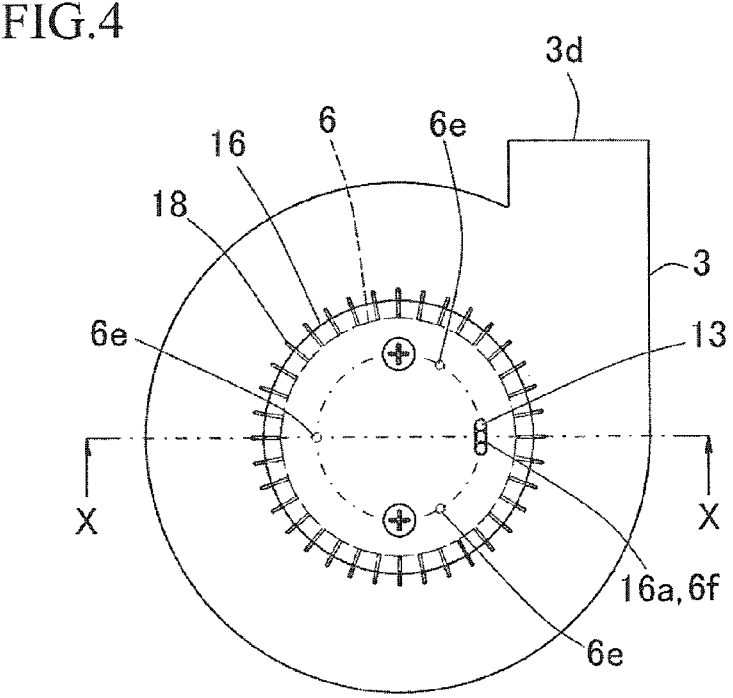
FIG. 4 is a plan view of the blower of another embodiment seen form the motor case side.
Figure 5:
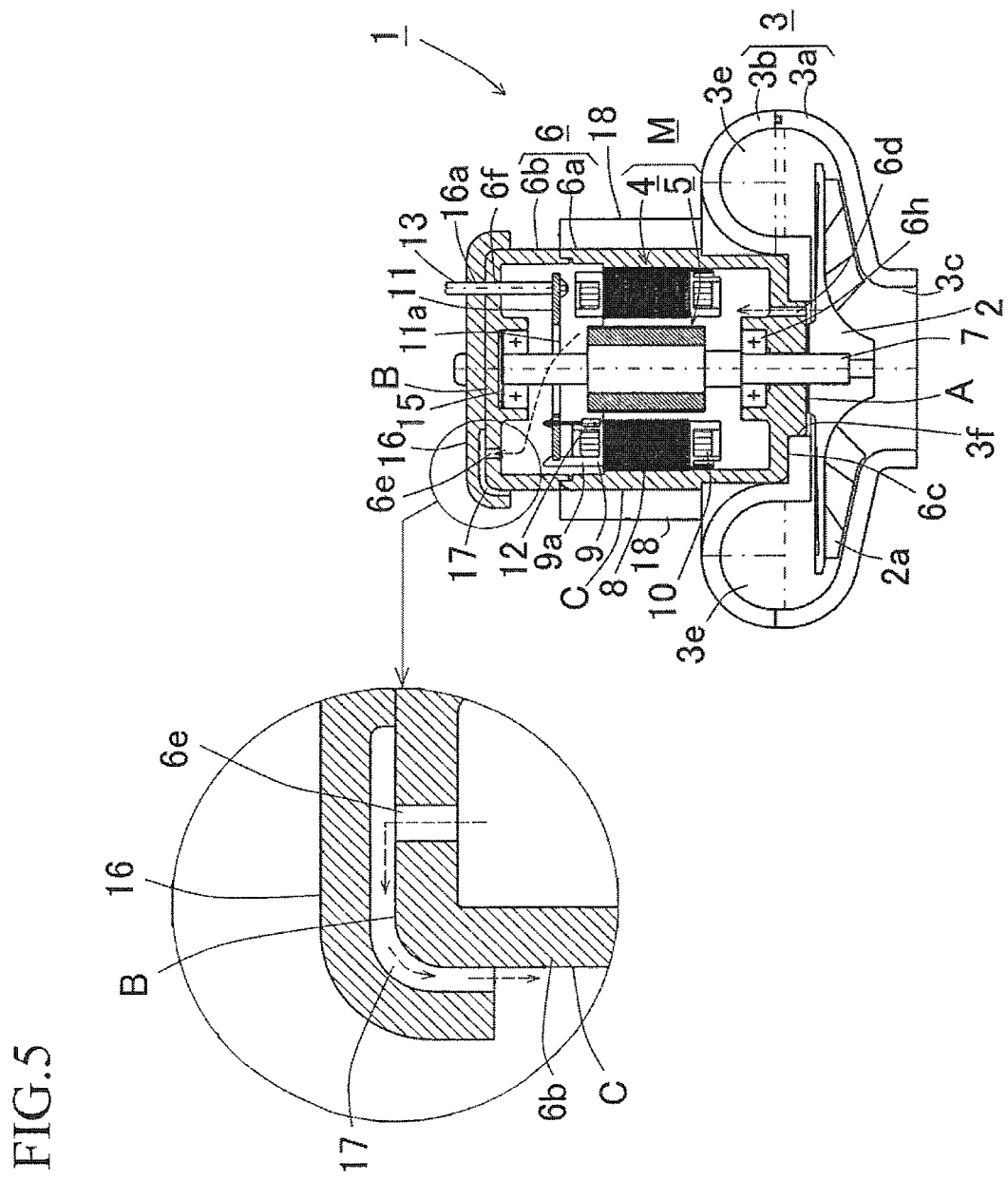
FIG. 5 includes a sectional view of the blower taken along a line X-X shown in FIG. 4 and an enlarged sectional view of a guide member, which introduces discharged air, which has been discharged from second communication holes.

Successively, another embodiment of the blower 1 will be explained with reference to FIGS. 4 and 5. Note that, the structural elements explained in the former embodiment are assigned the same reference symbols and explanation will be omitted.

Inner structures accommodated in the blower case 3 and the motor case 6 are the same as those of the former embodiment. As shown in FIGS. 4 and 5, heat radiation fins 18 are radially extended from the outside face of the first motor case constituting member 6a of the motor case 6.

The guide member 16, which constitutes the external guidance path 17, covers the other axial end face B of the second motor case constituting member 6b as well as the former embodiment. As described above, the heat radiation fins 18 are provided to the outside face of the first motor case constituting member 6a. With this structure, the motor case 6 can be efficiently cooled by the discharged air, which is introduced toward the outside face of the motor case 6 by the guide member 16, and heat radiation performed by the heat radiation fins 18.

In the above described embodiments, the motor M is an inner rotor-type motor, but an outer rotor-type motor may be employed as far as ventilation performance of a rotor yoke is secured.

In the above described embodiments, numbers of the first communication holes 6d and second communication holes 6e are three, but they may be optionally increased and reduced. And, the second communication holes 6e are circumferentially shifted 60° with respect to the first communication holes 6d, but the positional relationship between the holes 6d and 6e is not limited to the embodiments. Further, the shape of the second communication holes 6e is not limited to the circular shape, and other shapes may be adopted.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alternations could be made hereto without departing from the spirit and scope of the invention.

What is claimed is:

1. A blower, comprising:
   a blower case accommodating an impeller;
   a motor case accommodating a stator and a rotor, the motor case being integrated with the blower case; and
   a shaft, to which the impeller and the rotor are attached, being pierced through the blower case and the motor case,
   wherein an air is sucked into the blower case, by rotation of the impeller, from an axial direction and blown out in a circumferential direction,
   a first communication hole, which is formed in one of axial end faces of the motor case, introduces a part of compressed air from the blower case into the motor case,
   a second communication hole, which is formed in the other axial end face of the motor case, discharges the compressed air, which has passed through the motor case, to outside of the motor case,
   a guide member, which covers the other axial end face of the motor case and whose outer periphery is curved, on an outer edge of the other end face of the motor case, along an outer circumference of the motor case, is attached,
   between the other end face of the motor case in the axial direction and the outer circumferential face of the motor case, and
   by actuating a motor, the compressed air, which has been introduced from the blower case into the motor case via the first communication hole, is discharged from the second communication hole, and the discharged air, which has been discharged from the second communication hole, is introduced by the guide member via the external guidance path and blown out toward the outside face of the motor case.

2. The blower according to claim 1, wherein heat radiation fins are provided to the outside face of the motor case.

3. The blower according to claim 1, wherein a plurality of the first communication holes are formed around the shaft, and a plurality of the second communication holes are formed around the shaft, and each of the second communication holes is circumferentially shifted a prescribed angle with respect to each of the first communication holes.

4. The blower according to claim 2, wherein a plurality of the first communication holes are formed around the shaft, and a plurality of the second communication holes are formed around the shaft, and each of the second communication holes is circumferentially shifted a prescribed angle with respect to each of the first communication holes.

* * * * *